(12) United States Patent
Harmening et al.

(10) Patent No.: US 12,491,472 B2
(45) Date of Patent: Dec. 9, 2025

(54) METHOD FOR PREPARING AN ALUMINA SUPPORTED PEROVSKITE TYPE OXIDE COMPOSITION, ALUMINA SUPPORTED PEROVSKITE TYPE OXIDE COMPOSITION AND ITS USE

(71) Applicant: Sasol Germany GmbH, Hamburg (DE)

(72) Inventors: Thomas Harmening, Munster (DE); Marcos Schoneborn, Hamburg (DE)

(*) Notice: Subject to any disclaimer, the term of this patent is extended or adjusted under 35 U.S.C. 154(b) by 676 days.

(21) Appl. No.: 17/774,893

(22) PCT Filed: Nov. 12, 2020

(86) PCT No.: PCT/EP2020/081977
§ 371 (c)(1),
(2) Date: May 6, 2022

(87) PCT Pub. No.: WO2021/094495
PCT Pub. Date: May 20, 2021

(65) Prior Publication Data
US 2022/0387933 A1    Dec. 8, 2022

(30) Foreign Application Priority Data
Nov. 12, 2019  (EP) .................................. 19208736

(51) Int. Cl.
| | | |
|---|---|---|
| *B01J 6/00* | (2006.01) | |
| *B01D 53/86* | (2006.01) | |
| *B01J 21/04* | (2006.01) | |
| *B01J 23/00* | (2006.01) | |
| *B01J 23/83* | (2006.01) | |
| *B01J 35/00* | (2006.01) | |
| *B01J 35/61* | (2024.01) | |
| *B01J 35/63* | (2024.01) | |

(Continued)

(52) U.S. Cl.
CPC .......... *B01D 53/8628* (2013.01); *B01J 6/001* (2013.01); *B01J 21/04* (2013.01); *B01J 23/002* (2013.01); *B01J 23/83* (2013.01); *B01J 35/00* (2013.01); *B01J 35/613* (2024.01); *B01J 35/615* (2024.01); *B01J 35/633* (2024.01); *B01J 35/635* (2024.01); *B01J 35/638* (2024.01); *B01J 37/0201* (2013.01); *B01J 35/733* (2024.01); *B01J 35/77* (2024.01); *B01J 2235/15* (2024.01)

(58) Field of Classification Search
None
See application file for complete search history.

(56) References Cited

U.S. PATENT DOCUMENTS 4,921,829 A    5/1990  Ozawa et al.
5,882,616 A    3/1999  Ziebarth et al.
(Continued)

OTHER PUBLICATIONS

Onrubia-Calvo et al. "Strontium doping and impregnation onto alumina improve the NOx storage and reduction capacity of LaCoO3 perovskites", Catalysis Today 333 (2019) 208-218. (Year: 2018).*

*Primary Examiner* — Coris Fung
*Assistant Examiner* — Jialan Zhang
(74) *Attorney, Agent, or Firm* — Werner IP Law, P.C.

(57) ABSTRACT

The present invention relates to a method for preparing an alumina supported perovskite type oxide composition, to an alumina supported perovskite type oxide composition and to the use of such an alumina supported perovskite type oxide composition in catalytic systems in emission control applications.

15 Claims, 3 Drawing Sheets

(51) Int. Cl.
  *B01J 35/70* (2024.01)
  *B01J 35/77* (2024.01)
  *B01J 37/02* (2006.01)

(56) References Cited

U.S. PATENT DOCUMENTS

2009/0208396 A1    8/2009   Yang et al.
2012/0046163 A1    2/2012   Ifrah et al.

* cited by examiner

METHOD FOR PREPARING AN ALUMINA SUPPORTED PEROVSKITE TYPE OXIDE COMPOSITION, ALUMINA SUPPORTED PEROVSKITE TYPE OXIDE COMPOSITION AND ITS USE

FIELD OF THE INVENTION

The present invention relates to a method for preparing an alumina supported perovskite type oxide composition, to an alumina supported perovskite type oxide composition and its use in catalytic systems in emission control applications.

BACKGROUND OF THE INVENTION

To abate the NOx content in exhaust gas of lean-burn engines, designated NOx after-treatment systems are required. This is because the reduction of NOx to $N_2$, as in a three-way catalyst operated under nearly stoichiometric conditions, is not possible under the prevailing oxidizing conditions. Therefore, a special exhaust gas after-treatment catalyst has been developed containing a material that is able to store NOx, e.g. as a nitrate/nitrite under lean conditions. By applying short stoichiometric or rich operation conditions the stored NOx can then be converted to nitrogen and the storage material is regenerated. This catalyst is commonly called a (lean) NOx-trap catalyst. The NOx-trap catalyst can be installed upstream of a zeolite based Selective Catalytic Reduction ("SCR") catalyst that is highly efficient at higher temperatures.

NOx trap catalysts usually contain $CeO_2$ as a storage component especially for storing NOx in a low to medium temperature range. The drawback is that during DeNOx steps, thus regeneration in rich exhaust gas composition, a large fraction of reducing agents are consumed due to the redox activity of ceria. This leads to a substantial fuel penalty because of the reduction of $Ce^{4+}$ to $Ce^{3+}$.

Therefore, there is demand for the development of materials that are able to store NOx in the low- to medium temperature range without being redox active under the operating conditions.

Non-redox active perovskites of formula $ABO_3$ (where A is a cation including a rare-earth, alkaline earth, alkali, $Pb^{2+}$, and $Bi^{3+}$, whereas B is a cation including transition metals) are an attractive alternative. These compounds, however, usually do not have the requisite surface area to react with NOx in the bulk state.

The perovskites and their use in exhaust gas emission catalyst systems are disclosed in US2012/0046163A1. In this patent a composite of a lanthanum-based perovskite on a support made of alumina or aluminum oxyhydroxide is disclosed. The composite is made by a precipitation process. This process produces a perovskite that is advantageous over the prior art. In US2012/0046163 the required low crystallinity of the perovskite and its importance is taught in paragraph 3 thereof in that it is stated that the perovskite is to be dispersed as finely as possible over the support that is to say that it is to be provided in the form of fine particles. However, the required low crystallinity for specific catalytic applications is not obtained by the process taught in US2012/0046163.

U.S. Pat. No. 4,921,829 discloses a two-step process for preparing supported perovskite mixed oxide. In example 5 in the first step $LaAlO_3$ powder is prepared from y-alumina and lanthanum nitrate. This $LaAlO_3$ is mixed with an aqueous solution of the perovskite precursor compounds, dried and calcined. Therefore, $LaAlO_3$ is coexistent with a catalyst ingredient of a perovskite material.

U.S. Pat. No. 5,882,616 discloses a two-step process for preparing a supported perovskite mixed oxide. In example 1 in the first step y-alumina is impregnated with lanthanum nitrate. This stabilized alumina is impregnated three times with aqueous solutions of the perovskite precursor compounds, dried and calcined. Although crystallite sizes are not reported the relatively sharp reflections in the X-ray diffraction pattern indicate that the perovskite crystallites are larger than 5 nm.

There is therefore still a need to develop a homogenous perovskite type oxide composite having a perovskite structure on an alumina support having improved characteristics.

DESCRIPTION OF THE INVENTION

According to a first aspect of the invention there is provided a method for preparing an alumina supported perovskite type oxide composition, the method comprising the steps of:
i) providing a doped alumina, the doped alumina comprising
   a. alumina and a rare-earth oxide, or
   b. alumina and an alkaline earth oxide, or
   c. alumina and a mixture of a rare-earth oxide and an alkaline earth oxide, wherein the doped alumina is provided by a method comprising the following steps:
   A) preparing a boehmite suspension, the boehmite suspension comprising a boehmite
   B) preparing an aqueous salt solution, the aqueous salt solution comprising
      a. a rare-earth salt, or
      b. an alkaline earth salt, or
      c. a mixture of a rare-earth salt and an alkaline earth salt;
   C) combining the boehmite suspension with the aqueous salt solution to form a boehmite salt mixture;
   D) drying the boehmite salt mixture to form a dried boehmite salt mixture; and
   E) calcining the dried boehmite salt mixture to form the doped alumina;
ii) impregnating the doped alumina provided with an impregnation aqueous solution, the impregnation aqueous solution comprising one or a mixture of: water soluble rare-earth salts, water soluble alkaline earth salts, water soluble alkali salts, water soluble salts of $Pb^{2+}$, water soluble salts of $Bi^{3+}$, and water soluble transition metal salts to form an impregnated doped alumina; and
iii) calcining the impregnated doped alumina to obtain the alumina supported perovskite type oxide composition.

Boehmite is defined as any alumina having the molecular formula $AlOOH*xH_2O$, where x is between 0 and 0.5, including boehmite and pseudo-boehmite.

The boehmite suspension may further comprise silica, titania, water soluble salts of titanium or zirconium or mixtures thereof.

The boehmite suspension comprises the boehmite precursor and at least water preferably in a ratio of 2:98 to 20:80. The boehmite suspension optionally comprises pH modifying additives for example carboxylic acids or ammonia.

More preferably the boehmite suspension is prepared by the hydrolysis of an Al-alkoxide.

The aqueous salt solution to prepare the doped alumina preferably comprises at least water and a water-soluble rare-earth salt, a water soluble alkaline earth salt, or mixtures thereof. The rare-earth salt is preferably an acetate or a nitrate of the elements having the atomic numbers 57-60, most preferably La acetate. The alkaline earth salt is preferably an alkaline earth acetate or an alkaline earth nitrate. The alkaline earth salt is preferably an acetate of Ca, Sr, or Ba, most preferably Sr acetate.

The doped alumina (this is after calcination) comprises a maximum content of rare earth oxide, alkaline earth oxide or the mixture thereof of at most 20 wt. %, preferably a maximum content of less than 12 wt. % and most preferably a content of less than 10 wt. %. At least 50 wt. %, preferably at least more than 90 wt. % and most preferably 100 wt. %, of rare-earth oxide, alkaline earth oxide or the mixture thereof which are present in the alumina supported perovskite type oxide composition are added to the boehmite suspension as the rare-earth salt, the alkaline earth salt or the mixture thereof. The oxide is formed from the salt by calcination. The doped alumina provides homogeneously dispersed nucleation sites in the step of impregnating the doped alumina with an impregnation aqueous solution in order to obtain the alumina supported perovskite type oxide composition.

In particular if the doped alumina (this is after calcination) comprises lanthan oxide, the maximum content of lanthan oxide is of at most 20 wt. %, preferably the maximum content of less than 12 wt. % and most preferably a content of less than 10 wt. %. The lanthan oxide is formed from the lanthan salt by calcination. Due to the low content of the lanthan oxide no $LaAlO_3$ is formed in the alumina supported perovskite type oxide composition.

The boehmite salt mixture is preferably spray dried to form a dried boehmite salt mixture.

The dried boehmite salt mixture is preferably calcined at a temperature of between 450° C. to 1200° C., preferably a temperature of between 500° C. and 600° C. for a period of at least 0.5 hours and more preferably 0.5 to 5 hours, to form a doped alumina. Temperature and time are independently selected Impregnation of the doped alumina may be carried out by any impregnation method known in the art, preferably by incipient wetness impregnation. Such a method generally provides for impregnating between 80 and 100% of the pore volume of the doped alumina with the impregnation aqueous solution.

The impregnation aqueous solution comprises a mixture of water-soluble salts as per the specific stoichiometric ratio of the perovskite $ABO_3$ type oxide formula.

These one or more water soluble salts of the impregnation aqueous solution are preferably the acetates or nitrates of the rare-earth elements, preferably the acetates or nitrates of rare-earth elements having the atomic number between 57 and 60, more preferably the acetates or nitrates of La, acetates or nitrates of alkaline earth elements, preferably the acetates or nitrates of Sr, Ba and Ca, more preferably the acetate or nitrate of Sr, acetates or nitrates of $Pb^{2+}$ and/or $Bi^{3+}$, and water soluble salts of transition metals comprising ammonium-iron-citrate, ammonium-titanium-lactate, zirconium acetate or mixtures thereof. More preferably, the water-soluble salts are zirconium acetate, ammonium-iron-citrate and ammonium-titanium-lactate.

Step ii) of the first aspect of the invention provides for an impregnation aqueous solution comprising a mixture of water-soluble salts. The water soluble salts comprise may comprise mixtures of at least one of a), b) and c) with at least one of d):
 a) acetates or nitrates of the rare-earth elements, preferably acetates or nitrates of rare-earth elements having an atomic number between 57 and 60, more preferably the acetate or nitrate of La,
 b) acetates or nitrates of alkaline earth elements, preferably the acetates or nitrates of one or more of Sr, Ba and Ca, more preferably the acetate or nitrate of Sr,
 c) one or more of acetates or nitrates of $Pb^{2+}$ and $Bi^{3+}$ and
 d) one or more water soluble salts of transition metals, such as the transition metal salts of Fe, Ti and/or Zr, comprising for example ammonium-iron-citrate, ammonium-titanium-lactate, ammonium-iron-citrate, zirconium acetate or mixtures thereof.

Alternatively, the impregnation aqueous solution may comprise only one water soluble salt, for example ammonium-iron-citrate.

Due to the use of the doped alumina preferably only one impregnation step is applied to obtain an impregnated doped alumina having a capacity for a high loading by impregnation.

The impregnated doped alumina is calcined preferably at a temperature of between 500° C. and 1100° C., most preferably at a temperature of between 700° C. and 1000° C. Calcination may run for a period of at least 0.5 hours, more preferably between 0.5 and 5 hours, for example 3 hours. Temperature and time are independently selected. Due to the homogeneously dispersed impregnation obtained in step ii) an alumina supported perovskite type oxide composition having a very low perovskite crystallite size is obtained.

According to a second aspect of the invention, there is provided an alumina supported perovskite type oxide composition prepared according to the method of the invention.

According to a third aspect of the invention, there is provided an alumina supported perovskite type oxide composition composite comprising the following features:
 i) at least 50 wt. %, preferably between 75 and 95 wt. %, of a doped alumina; and
 ii) between 5 and 50 wt. %, preferably between 5 and 25 wt. %, of a perovskite type oxide of formula I:

$$ABO_3, \qquad (I)$$

wherein:
 A comprises a rare-earth element, an alkaline earth element, an alkali element, $Pb^{2+}$, $Bi^{3+}$ or mixtures thereof; and
 B comprises one or more transition metal including mixtures of transition metals;

$ABO_3$ being preferably characterized by having a crystallite size of less than 5 nm, preferably a crystallite size of between 4 nm and 5 nm, after calcination at 850° C. for 3 hours and having a crystallite size of less than 2 nm after calcination at 700° C. for 4 hours.

The alumina supported perovskite type oxide composition is further characterized by having a weighted intensity ratio of less than 10, preferably less than 8. The weighted intensity ratio is determined as per equation 1. The X-ray diffraction pattern of the perovskite structure using Copper K-alpha emission having a wavelength of 1.54 Å comprises a strong reflection around 2θ=32°.

The X-ray diffraction pattern of a transition alumina comprises a strong reflection around 2θ=46°.

The weighted intensity ratio R (see equation 1) is a measure for the crystallinity of the perovskite material on the alumina support.

$$R=[(I_{32}/I_{46})]/m_P \quad \text{(equation 1)}$$

$I_{32}$: Intensity of the reflection around 32°
$I_{46}$: Intensity of the reflection around 46°
$m_P$: mass of perovskite/(mass of perovskite (calculated as $ABO_3$)+mass of alumina)

The doped alumina is as defined and prepared as under the first aspect of the invention. The alumina supported perovskite type oxide composition preferably comprises at least 80 wt. % of the doped alumina.

Preferably, A of the perovskite type oxide according to formula I comprises a mixture of an alkaline earth element, more preferably at least one of Sr, Ba or Ca, and a rare-earth element, more preferably, an element having an atomic number between 57 and 60. Most preferably, A comprises a mixture of Sr and La.

Preferably, B of the perovskite type oxide according to formula I comprises a mixture of two distinct transition metals, preferably Fe, and at least one element of the group IVa of the Periodic Table of Elements. More preferably, B comprises a mixture of Fe, Ti and Zr.

Components A and B are independently selected such that a charge balance with three oxide anions is achieved, thus the sum of the molar proportion weighted oxidation states of the individual components is equal to +6.

The perovskite type oxide is preferably homogenously dispersed in the matrix of the alumina where both form the alumina supported perovskite type oxide composition. Without being bound by theory the Applicant believes that a homogenous dispersion of the perovskite type oxide small crystals enables the alumina matrix to act as a diffusion barrier leading to beneficial properties of the alumina supported perovskite type oxide composite.

The alumina supported perovskite type oxide composition may have a BET specific surface area between 50 $m^2/g$ and 300 $m^2/g$, preferably between 100 $m^2/g$ and 200 $m^2/g$, and a pore volume of between 0.1 ml/g and 1.5 ml/g, preferably between 0.5 ml/g and 1.0 ml/g.

The invention will now be described with reference to the following non-limiting examples and Figures in which.

Figure 4:
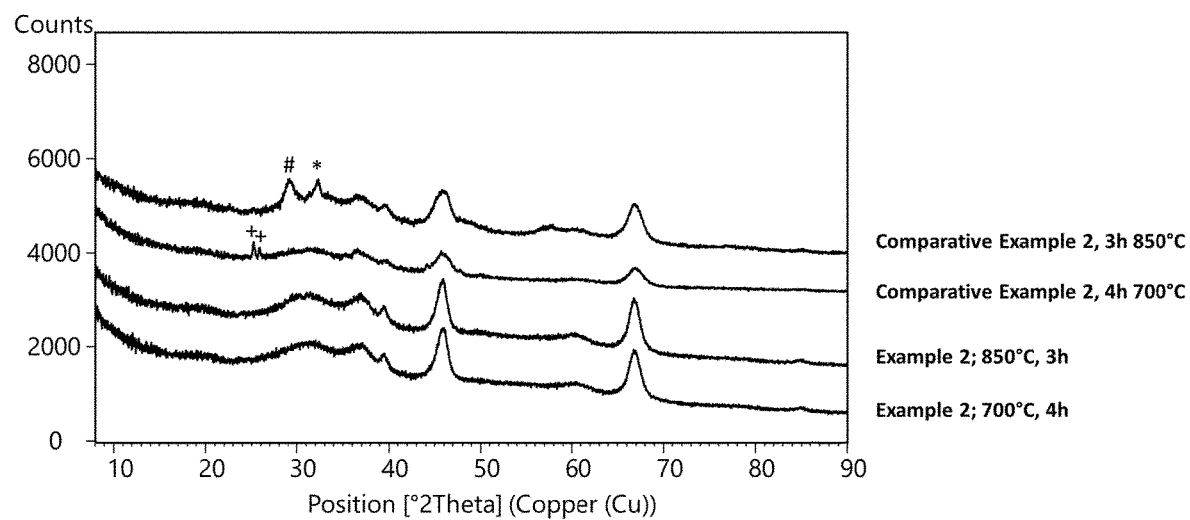
Figure 5:
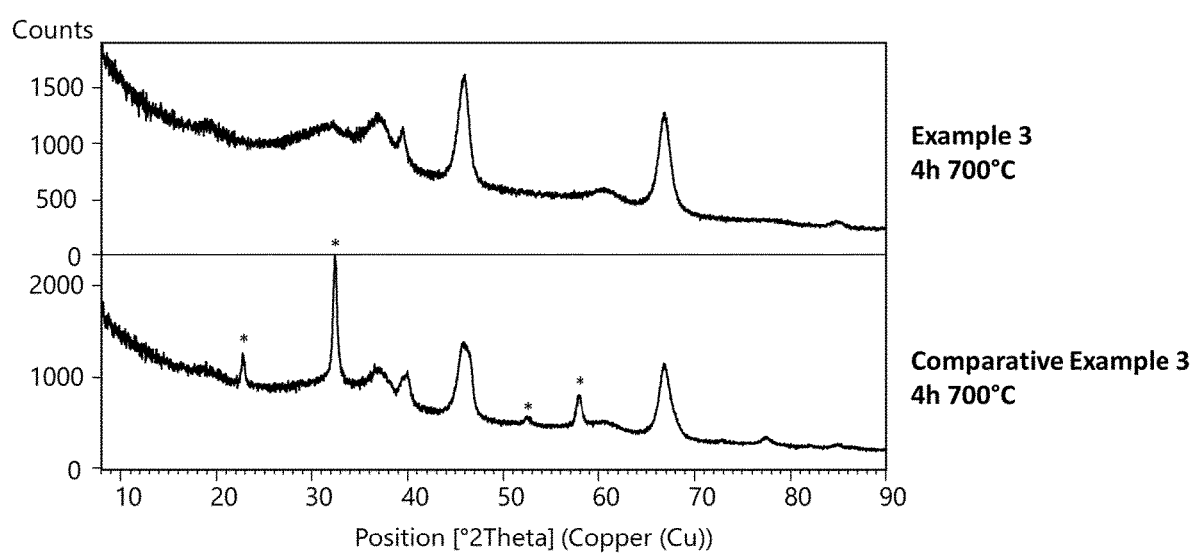

FIG. 4 represents the X-ray diffraction pattern of Example 2 and Comparative Example 2 after calcination at 700° C. for 4 hours and after calcination at 850° C. for 3 hours where the reflection marked with an asterisk (*) shows the reflection of the X-ray pattern of perovskite type oxide and the reflection marked with a hash (#) the reflection of the X-ray pattern of $SrAl_2O_4$ and the reflections marked with plus (+) the reflections of the X-ray pattern of $SrCO_3$;

FIG. 5 represents the X-ray diffraction pattern of Example 3 and Comparative Example 3 after calcination at a temperature of 700° C. for 4 hours where the reflections marked with an asterisk (*) show the X-ray pattern of perovskite type oxide.

Homogeneity is measured by scanning-electron-microscope (SEM) cross-section imaging, optionally together with EDX (Energy Dispersive X-ray Analysis) element mapping revealing the domain sizes of the doped alumina and perovskite type oxide.

The crystal size of the perovskite type oxide is determined by using the Debye-Scherrer method analyzing the (022)-reflection (in space group Fm-3c). It is less than 5 nm when determined after a calcination at 850° C. for 3 hours and less than 2 nm when determined after a calcination at 700° C. for 3 hours.

Specific surface area and pore volume are measured with $N_2$ physisorption using typical volumetric devices like the Quadrasorb from Quantachrome at the temperature of liquid nitrogen. The specific surface area is determined using BET theory (DIN ISO 9277) while the pore volume is determined according to DIN 66131.

EXAMPLES

Example 1—Composite with 20 wt. % of Perovskite $La_{0.5}Sr_{0.5}Fe_{0.5}Ti_{0.5}O_3$ A gamma alumina containing 10 wt. % $La_2O_3$ was prepared by mixing an aqueous solution of Lanthanum acetate with a suspension of 5 wt. % boehmite in water. The mixture was subsequently spray dried and calcined at 500° C. for 1 h.

The La doped alumina was impregnated by incipient wetness impregnation with a mixed solution of Sr-acetate, Ammonium-Iron-Citrate and Tyzor LA (titanium solution) to achieve a loading of 4.8 wt. % SrO, 3.8 wt. % $Fe_2O_3$ and 3.8 wt. % $TiO_2$ after calcination. The product was calcined at 850° C. for 3 h and 700° C. for 4 h, respectively.

Figure 1:
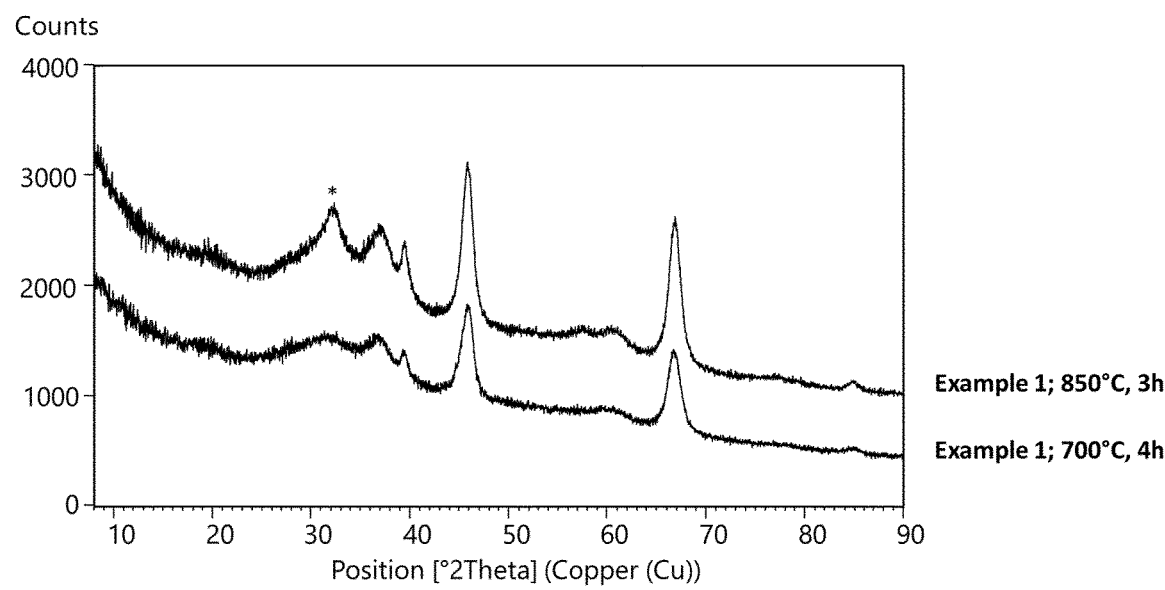
FIG. 1 represents the X-ray diffraction pattern of Example 1 after calcination at 700° C. for 4 hours and after calcination at 850° C. for 3 hours where the reflection marked with an asterisk (*) shows a reflection of the X-ray pattern of a perovskite type oxide.

FIG. 1 shows the X-ray diffraction pattern of the material obtained by Example 1 after calcination at 850° C. for 3 hours and at 700° C. for 4 hours.

Example 2—Composite with 20 wt. % of Perovskite $La_{0.5}Sr_{0.5}Fe_{0.5}Zr_{0.5}O_3$ A gamma alumina containing 7.8 wt. % $La_2O_3$ was prepared by mixing an aqueous solution of Lanthanum acetate with a suspension of 5 wt. % boehmite in water. The mixture was subsequently spray dried and calcined at 500° C. for 1 h.

The doped alumina was impregnated by incipient wetness impregnation with a mixed solution of Ammonium-Iron-Citrate, Zr-acetate and Sr-acetate to achieve a loading of 3.4 wt. % $Fe_2O_3$, 5.3 wt. % $ZrO_2$ and 4.4% SrO. The product was calcined at 850° C. for 3 h and 700° C. for 4 h, respectively.

Figure 2:
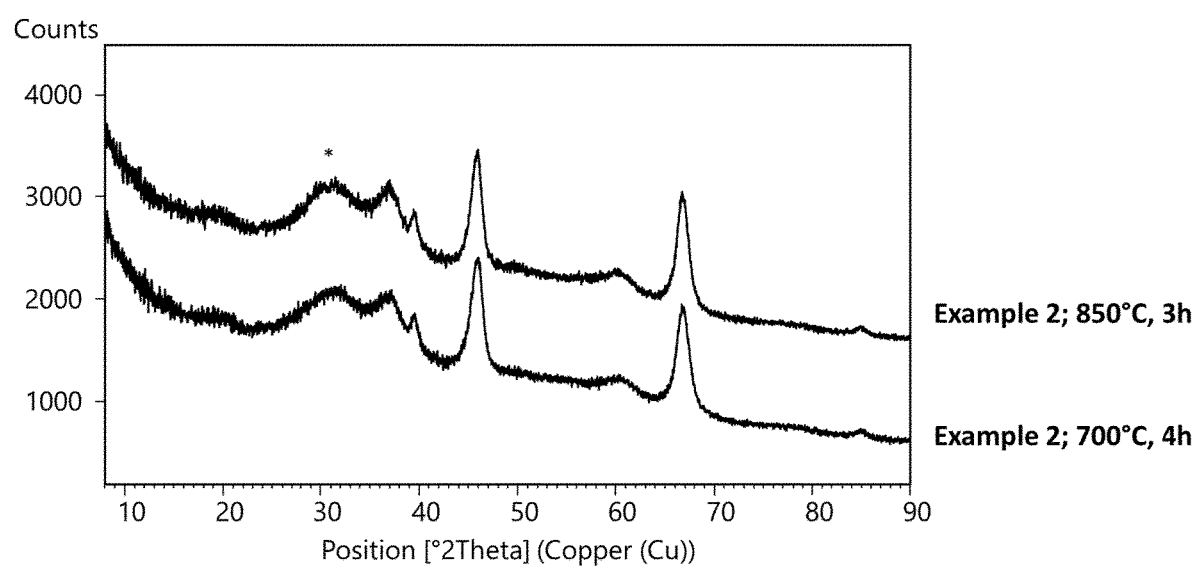
FIG. 2 represents the X-ray diffraction pattern of Example 2 after calcination at 700° C. for 4 hours and after calcination at 850° C. for 3 hours where the reflection marked with an asterisk (*) shows the reflection of the X-ray pattern of perovskite type oxide.

The X-ray diffraction pattern of the material obtained after calcination at 850° C. for 3 hours and at 700° C. for 4 hours calcination is shown in FIG. 2.

Comparative Example 1—Composite with 20 wt. % of Perovskite $La_{0.5}Sr_{0.5}Fe_{0.5}Ti_{0.5}O_3$ The composite was prepared according to Example 5 of U.S. Pat. No. 4,921,829.

$LaAlO_3$ powder was first synthesized by adding 100.9 g of gamma alumina to 400 ml of an aqueous solution of 425 g of lanthanum nitrate hexahydrate. The resultant mixture was evaporated and dried. Thereafter, the mixture was calcined in air at 600° C. for 3 hours and further at 900° C. for 8 hours to obtain the LaAlO$_3$ powder.

In a second step the LaAlO$_3$ powder was mixed with an aqueous solution of nitrates of lanthanum, strontium, iron and zirconium in quantities to achieve a loading of 3.4 wt. % Fe$_2$O$_3$, 5.3 wt. % ZrO$_2$, 4.4 wt. % SrO and additional 6.9 wt. % La$_2$O$_3$, in the calcined composite. The resultant mixture was dried in air at 110° C. for 10 hours and calcined at 700° C. for 4 h and 850° C. for 3 h, respectively.

Figure 3:
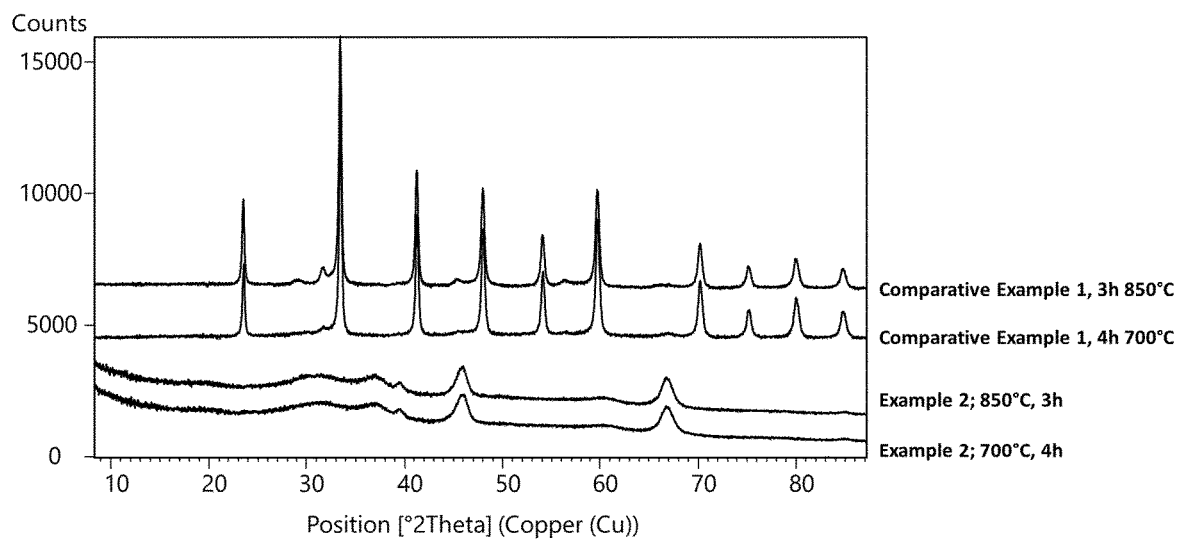
FIG. 3 represents the X-ray diffraction pattern of Example 2 and Comparative Example 1 after calcination at 700° C. for 4 hours and after calcination at 850° C. for 3 hours.

The X-ray diffraction pattern of the material obtained after calcination at 850° C. for 3 h and at 700° C. for 4 h calcination is shown in FIG. 3.

The results show that the obtained product differs from the compositions of the present invention in the way that no alumina is present, the perovskite crystal size is higher, and the specific surface area is substantially lower.

Comparative Example 2—Composite with 20 wt. % of Perovskite La$_{0.5}$Sr$_{0.5}$Fe$_{0.5}$Ti$_{0.5}$O$_3$ The composite was prepared according to Example 6 of U.S. Pat. No. 5,882,616.

25 g of gamma-alumina beads were impregnated twice with an aqueous solution containing nitrates of Lanthanum, strontium, iron and zirconium in quantities to achieve a loading of 6.9 wt. % La$_2$O$_3$, 3.4 wt. % Fe$_2$O$_3$, 5.3 wt. % ZrO$_2$ and 4.4 wt. % SrO in the calcined composite, 5 g ethanol and 10 g citric acid. The resultant material was dried under vacuum following the first impregnation (to remove the solution). After the second impregnation the product was calcined at 700° C. for 4 h and 850° C. for 3 h, respectively.

The X-ray diffraction pattern of the material obtained after calcination at 850° C. for 3 hours and at 700° C. for 4 hours calcination is shown in FIG. 4.

The powder X-ray diffraction pattern reveals phases that significantly differ from the compositions of the present invention. In detail, the strontium does not form part of the perovskite structure but is instead present in the form of SrCO$_3$ after calcination at 700° C. and in the form SrAl$_2$O$_4$ after calcination at 850° C. Therefore, it can be concluded that this procedure is not suitable for forming the desired composition. The Results are included in Table 1 hereunder.

Example 3—Composite with 10 wt. % of Perovskite LaFeO$_3$

A gamma alumina containing 11.7 wt. % La$_2$O$_3$ was prepared by mixing an aqueous solution of Lanthanum acetate with a suspension of 5 wt. % boehmite in water. The mixture was subsequently spray dried and calcined at 500° C. for 1 h.

The doped alumina was impregnated by incipient wetness impregnation with a solution of Ammonium-Iron-Citrate to achieve a loading of 3.3 wt. % Fe$_2$O$_3$. The product was calcined at 850° C. for 3 h and 700° C. for 4 h, respectively.

The X-ray diffraction pattern of the material obtained after 700° C., 4 h calcination is shown in FIG. 5.

Comparative Example 3—Composite with 10 wt. % of Perovskite LaFeO$_3$

The composite was prepared according to Example 3 of US2012/0046163A1.

A mixture of 2.2 g iron acetate in 75 ml water and 4.46 g lanthanum acetate in 75 ml water were mixed and added to a dispersion that was prepared by mixing 27 g of lanthanum doped alumina (commercially available as PURALOX TH100/150 L4) and 150 ml water. 11.2 g of 25% NH$_3$ solution were added to this mixture to reach a pH of 10. After stirring for 1.5 h the precipitate was filtered and the obtained powder calcined 4 h at 700° C.

The X-ray diffraction pattern of the material obtained after 700° C., 4 h calcination is shown in FIG. 5.

The comparison of the X-ray diffraction pattern patterns of the materials as per Example 3 and Comparative Example 3 clearly indicates the difference in crystallinity of the perovskite phases.

A crystalline perovskite phase can be detected for Comparative Example 3 as indicated by the asterisk in FIG. 2, whereas the perovskite reflection is very weak. Therefore, it can be concluded that perovskite phase exists in a nearly X-ray amorphous state.

The results are included in Table 2 hereunder.

TABLE 1

| | Example 1 | Example 2 | Comparative Example 1 | Comparative Example 2 |
|---|---|---|---|---|
| Perovskite molar composition | La0.5Sr0.5Fe0.5Ti0.5O3 | La0.5Sr0.5Fe0.5Zr0.5O3 | La0.5Sr0.5Fe0.5Ti0.5O3 | La0.5Sr0.5Fe0.5Ti0.5O3 |
| Perovskite wt. % | 20 | 20 | 20 | 20 |
| Other phase present | Al$_2$O$_3$ | Al$_2$O$_3$ | LaAlO$_3$ | SrAl$_2$O$_4$, Al$_2$O$_3$ |
| Crystal size (3 h 850° C.) | 2.7 nm | <2 nm | 16 nm | 7 nm |
| Crystal size (4 h 700° C.) | <2 nm | <2 nm | 6 nm | n.a. |
| Intensity ratio I32/I46 | 0.85 | 0.87 | n.a. | n.d. |
| Weighted intensity ratio R (see equation 1) | 4.3 | 4.3 | n.a. | n.d. |
| BET | 115 m$^2$/g | 122 m$^2$/g | 22 | n.d. |
| PV | 0.84 ml/g | 0.91 ml/g | 0.18 | n.d. | n.d. = not detected, n.a. = not applicable

TABLE 2

| | Example 3 | Comparative Example 3 |
|---|---|---|
| Perovskite molar composition | LaFeO$_3$ | LaFeO$_3$ |
| Perovskite wt. % | 10 | 10 |
| Crystal size (4 h 700° C.) | <2 nm | |
| Intensity ratio I32/I46 | 0.73 | 1.7 |
| Weighted intensity ratio R (see equation 1) | 7.3 | 17 |
| BET | 123 m$^2$/g | 119 m$^2$/g |
| PV | 0.96 ml/g | 0.85 ml/g |

The invention claimed is:

1. An alumina supported perovskite oxide composition composite comprising the following features:
   i) at least 50 wt. % of a doped alumina; and
   ii) between 5 and 50 wt. % of a perovskite oxide of formula:

ABO$_3$, wherein:
   A comprises a rare-earth element, an alkaline earth element, an alkali element, Pb$^{2+}$, Bi$^{3+}$ or mixtures thereof and B comprises transition metals including mixtures of transition metals; and $ABO_3$ being characterized by having a crystallite size of less than 5 nm after calcination at 850° C. for 3 hours and having a crystallite size of less than 2 nm after calcination at 700° C. for 4 hours.

2. The alumina supported perovskite oxide composition composite of claim 1 having a weighted intensity ratio R of less than 10, calculated from the reflections at about $2\Theta=32°$ and $2\Theta=46°$ of an X-ray diffraction pattern of the alumina supported perovskite oxide composition composite obtained by Copper K-alpha emission having a wavelength of 1.54 Å and equation 1:

$$R=[(I_{32}/I_{46})]/m_p \qquad \text{(equation 1)}$$

$I_{32}$: Intensity of the reflection around 32°
$I_{46}$: Intensity of the reflection around 46°
$m_p$: mass of perovskite/(mass of perovskite (calculated as $ABO_3$)+mass of alumina).

3. The alumina supported perovskite oxide composition composite of claim 1 wherein A comprises a mixture of one alkaline earth element and one rare-earth element.

4. The alumina supported perovskite oxide composition composite of claim 1 wherein B comprises a mixture of two distinct transition metals.

5. The alumina supported perovskite oxide composition composite of claim 1 further characterized by comprising a specific surface area between 50 and 300 m²/g, and a pore volume of between 0.1 and 1.5 ml/g.

6. The alumina supported perovskite oxide composition composite of claim 1 obtainable according to a method comprising the steps of:
i) providing the doped alumina, the doped alumina comprising:
  a. alumina and a rare-earth oxide,
  b. alumina and an alkaline earth oxide, or
  c. alumina and a mixture of a rare-earth oxide and an alkaline earth oxide, wherein the doped alumina is provided by a method comprising at least the following steps:
   D) preparing a boehmite suspension, the boehmite suspension comprising a boehmite;
   E) preparing an aqueous salt solution, the aqueous salt solution comprising
    a. a rare-earth salt,
    b. an alkaline earth salt, or
    c. a mixture of a rare-earth salt and an alkaline earth salt;
   F) combining the boehmite suspension with the aqueous salt solution to form a boehmite salt mixture;
   D) drying the boehmite salt mixture to form a dried boehmite salt mixture; and
   E) calcining the dried boehmite salt mixture to form a doped alumina;
ii) impregnating the doped alumina with an impregnation aqueous solution, the impregnation aqueous solution comprising one or a mixture of water soluble rare-earth salts, water soluble alkaline earth salts, water soluble alkali salts, water soluble salts of $Pb^{2+}$, water soluble salts of $Bi^{3+}$, and water soluble transition metal salts to form an impregnated doped alumina; and
iii) calcining the impregnated doped alumina.

7. The alumina supported perovskite oxide composition composite of claim 1 wherein the doped alumina comprises no $LaAlO_3$.

8. The alumina supported perovskite oxide composition composite of claim 1 further characterized by comprising a specific surface area between 100 and 200 m²/g, and a pore volume of between 0.5 and 1.0 ml/g.

9. A method of preparing the alumina supported perovskite oxide composition composite of claim 1, the method comprising the steps of:
i) providing a doped alumina, the doped alumina comprising:
  a. alumina and a rare-earth oxide, or
  b. alumina and an alkaline earth oxide, or
  c. alumina and a mixture of a rare-earth oxide and an alkaline earth oxide, wherein the doped alumina is provided by a method comprising at least the following steps:
   A) preparing a boehmite suspension, the boehmite suspension comprising a boehmite;
   B) preparing an aqueous salt solution, the aqueous salt solution comprising
    a. a rare-earth salt, or
    b. an alkaline earth salt, or
    c. a mixture of a rare-earth salt and an alkaline earth salt;
   C) combining the boehmite suspension with the aqueous salt solution to form a boehmite salt mixture;
   D) drying the boehmite salt mixture to form a dried boehmite salt mixture; and
   E) calcining the dried boehmite salt mixture to form a doped alumina;
ii) impregnating the doped alumina with an impregnation aqueous solution, the impregnation aqueous solution comprising one or a mixture of water soluble rare-earth salts, water soluble alkaline earth salts, water soluble alkali salts, water soluble salts of $Pb^{2+}$, water soluble salts of $Bi^{3+}$, and water soluble transition metal salts to form an impregnated doped alumina; and
iii) calcining the impregnated doped alumina.

10. The method of claim 9 wherein the boehmite suspension further comprises silica, titania, water soluble salts of alkaline earth metals, water soluble salts of rare-earth metals, zirconium or mixtures thereof.

11. The method of claim 9 wherein the aqueous salt solution comprises at least water and a water-soluble rare-earth salt, a water soluble alkaline earth salt, or mixtures thereof.

12. The method of claim 9 wherein the impregnation of the doped alumina comprises incipient wetness impregnation.

13. The method of claim 9 wherein between 80 and 100% of the pore volume of the doped alumina is impregnated with the impregnation aqueous solution.

14. The method of claim 9 wherein the water soluble salts comprise mixtures of at least one of a), b) and c) with at least one of d):
a) acetates or nitrates of the rare-earth elements,
b) acetates or nitrates of alkaline earth elements,
c) one or more of acetates or nitrates of $Pb^{2+}$ and $Bi^{3+}$ and
d) one or more water soluble salts of transition metals comprising ammonium-iron-citrate, ammonium-titanium-lactate, zirconium acetate or mixtures thereof.

15. The method of claim 9 wherein the impregnated doped alumina is calcined at a temperature of between 500° C. and 1100° C., each for a period of at least 0.5 hours.

* * * * *